US012379839B2

(12) United States Patent
Yoon et al.

(10) Patent No.: US 12,379,839 B2
(45) Date of Patent: Aug. 5, 2025

(54) METHOD FOR PROVIDING CLIPBOARD FUNCTION, AND ELECTRONIC DEVICE SUPPORTING SAME

(71) Applicant: SAMSUNG ELECTRONICS CO., LTD., Suwon-si (KR)

(72) Inventors: Dahye Yoon, Suwon-si (KR); Junbae Lee, Suwon-si (KR); Sangheon Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/351,046

(22) Filed: Jul. 12, 2023

(65) Prior Publication Data

US 2023/0359352 A1 Nov. 9, 2023

Related U.S. Application Data

(63) Continuation of application No. PCT/KR2022/000576, filed on Jan. 12, 2022.

(30) Foreign Application Priority Data

Jan. 13, 2021 (KR) .......................... 10-2021-0004497

(51) Int. Cl.
*G06F 3/0482* (2013.01)
*G06F 3/04886* (2022.01)

(52) U.S. Cl.
CPC ........ *G06F 3/04886* (2013.01); *G06F 3/0482* (2013.01); *G06F 2203/04803* (2013.01)

(58) Field of Classification Search
CPC ................................................. G06F 3/048–05
See application file for complete search history.

(56) References Cited

U.S. PATENT DOCUMENTS 6,249,283 B1 * 6/2001 Ur ...................... G06V 30/1444
382/187
6,986,105 B2 1/2006 Walker, Jr.
(Continued)

FOREIGN PATENT DOCUMENTS

EP 2 990 930 A1 3/2016
JP 2018163641 A 10/2018
(Continued)

OTHER PUBLICATIONS

Extended European Search Report dated Mar. 26, 2024 for EP Application No. 22739682.7.

*Primary Examiner* — Daniel Rodriguez
(74) *Attorney, Agent, or Firm* — Nixon & Vanderhye P.C.

(57) ABSTRACT

An electronic device may include: a display for displaying content; a memory for storing data corresponding to the content; and a processor operatively connected to the display and the memory, wherein the processor may be configured to: display content on the display; in response to a user input related to copying, store at least a partial area of the content as first clip data; generate second clip data different from the first clip data on the basis of at least a part of a result of image or text analysis relating to the first clip data; and display, on the display, a first indicator relating to the first clip data and a second indicator relating to the second clip data. Other various embodiments identified through the specification are possible.

20 Claims, 13 Drawing Sheets

(56) References Cited

U.S. PATENT DOCUMENTS

| | | | |
|---|---|---|---|
| 8,832,578 B1* | 9/2014 | Shah | G06F 9/543 |
| | | | 715/224 |
| 9,003,283 B2 | 4/2015 | Xu | |
| 10,095,380 B2 | 10/2018 | Moon et al. | |
| 10,131,444 B1* | 11/2018 | Toews | G06F 9/543 |
| 10,871,894 B2 | 12/2020 | Polyulya et al. | |
| 11,086,512 B2 | 8/2021 | Hou et al. | |
| 11,132,115 B1* | 9/2021 | Brown | G06F 3/04842 |
| 11,556,241 B2 | 1/2023 | Polyulya et al. | |
| 2004/0230907 A1* | 11/2004 | Yang | G06F 40/166 |
| | | | 715/255 |
| 2009/0282063 A1* | 11/2009 | Shockro | G06F 3/0483 |
| 2012/0246594 A1* | 9/2012 | Han | G06F 40/166 |
| | | | 715/781 |
| 2013/0120271 A1* | 5/2013 | Lee | G06F 3/04883 |
| | | | 345/168 |
| 2013/0191769 A1* | 7/2013 | Park | G06F 3/0488 |
| | | | 715/770 |
| 2015/0009157 A1* | 1/2015 | Chung | G06F 9/543 |
| | | | 345/173 |
| 2015/0067609 A1* | 3/2015 | Moon | G06F 3/0482 |
| | | | 715/835 |
| 2015/0089335 A1* | 3/2015 | Korneev | G06V 30/413 |
| | | | 715/202 |
| 2015/0193104 A1 | 7/2015 | Cho et al. | |
| 2015/0378600 A1* | 12/2015 | Sloan | G06F 3/0482 |
| | | | 715/773 |
| 2016/0063339 A1* | 3/2016 | Kwon | G06F 3/04883 |
| | | | 382/229 |
| 2016/0117072 A1* | 4/2016 | Sharifi | G06F 9/543 |
| | | | 715/769 |
| 2016/0139766 A1* | 5/2016 | Kim | G06F 3/04842 |
| | | | 715/802 |
| 2016/0154686 A1* | 6/2016 | Huang | G06F 3/0488 |
| | | | 715/780 |
| 2016/0196055 A1 | 7/2016 | Park et al. | |
| 2017/0139575 A1* | 5/2017 | Chen | G06F 3/04842 |
| 2018/0113609 A1* | 4/2018 | Gnedin | G06F 3/04886 |
| 2018/0348927 A1 | 12/2018 | Jang et al. | |
| 2021/0096741 A1* | 4/2021 | Klein | G06F 1/1647 |

FOREIGN PATENT DOCUMENTS

| | | |
|---|---|---|
| KR | 20090128294 A | 12/2009 |
| KR | 20120066825 A | 6/2012 |
| KR | 20130052151 A | 5/2013 |
| KR | 20150024526 A | 3/2015 |
| KR | 101613905 B1 | 4/2016 |
| KR | 20160057783 A | 5/2016 |
| KR | 101741254 B1 | 5/2017 |
| KR | 101771900 B1 | 8/2017 |
| KR | 20180133138 A | 12/2018 |
| KR | 20200002490 A | 1/2020 |
| KR | 102214437 B1 | 2/2021 |

* cited by examiner

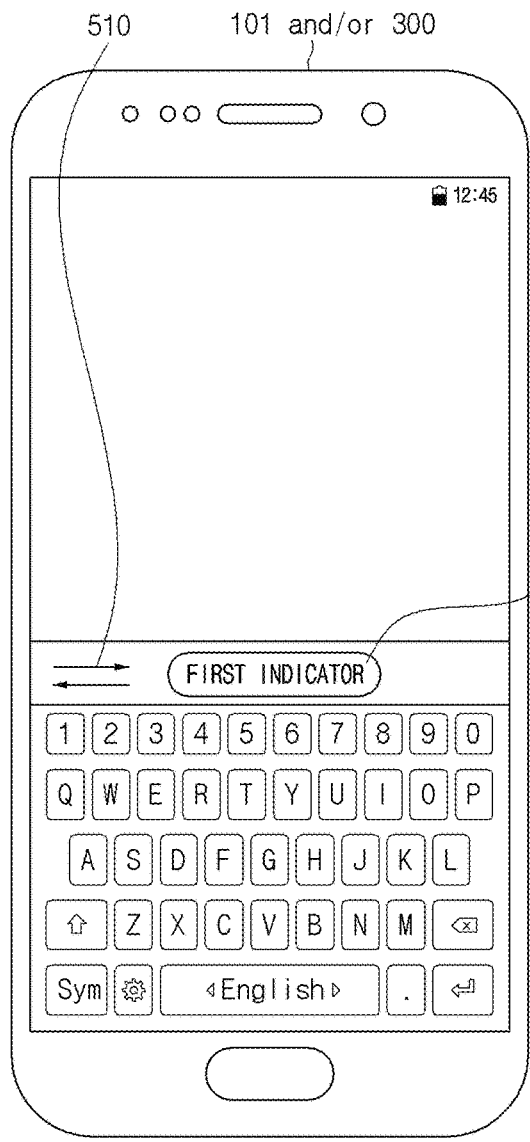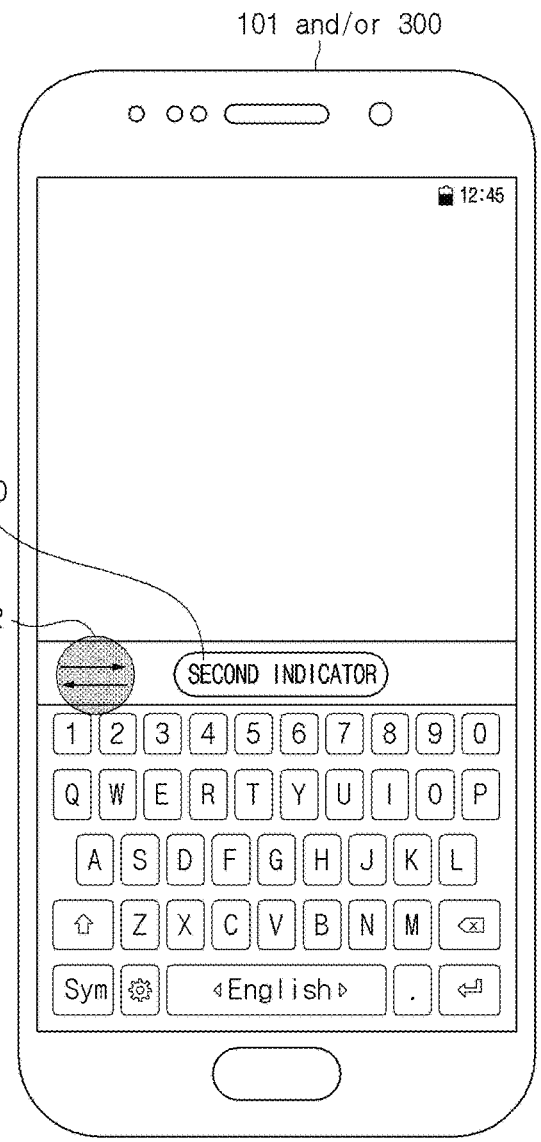
FIG.5A(a)  FIG.5A(b)

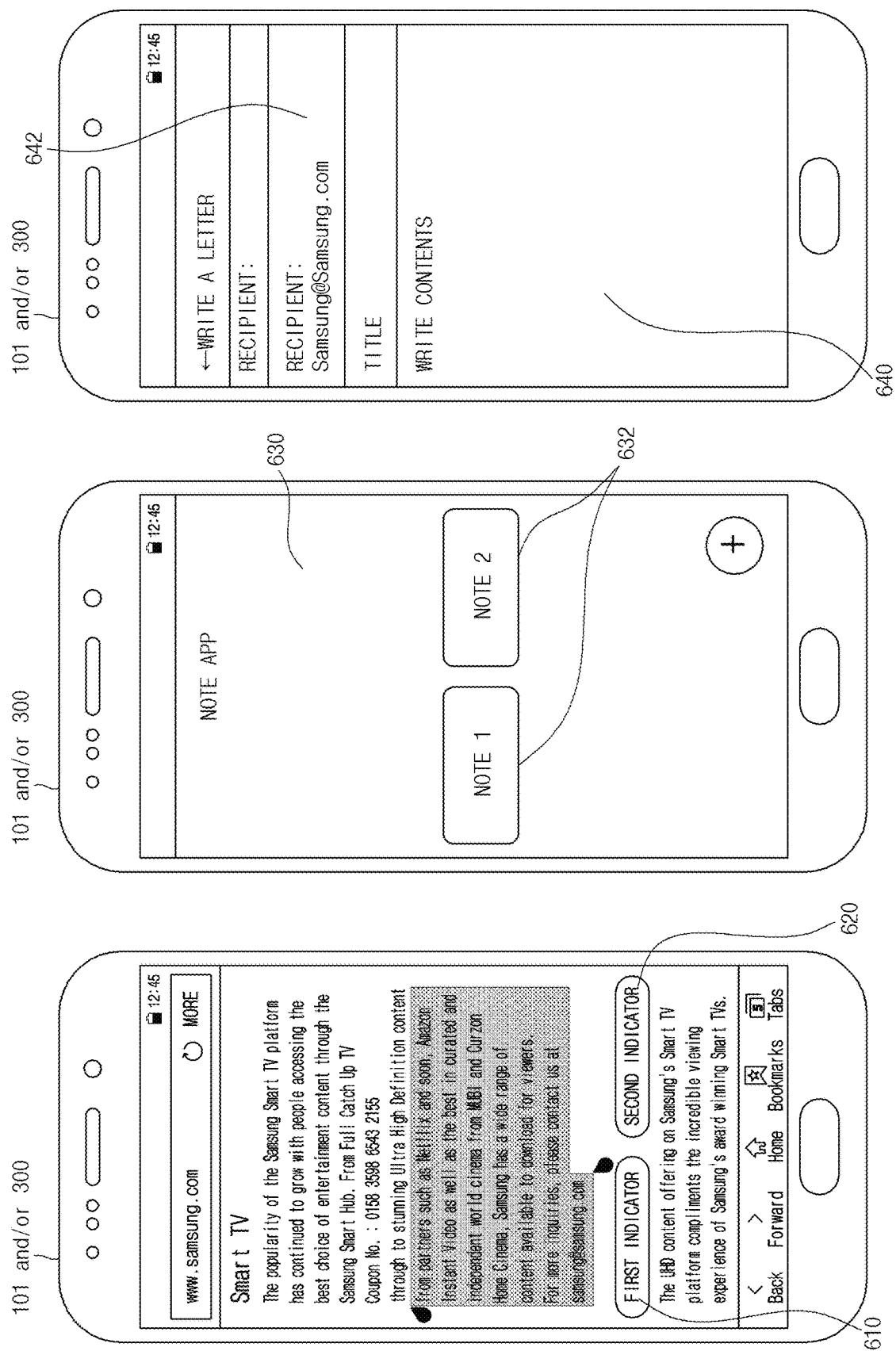

METHOD FOR PROVIDING CLIPBOARD FUNCTION, AND ELECTRONIC DEVICE SUPPORTING SAME

CROSS-REFERENCE TO RELATED APPLICATIONS

This application is a continuation of International Application No. PCT/KR2022/000576, filed on Jan. 12, 2022, designating the United States, in the Korean Intellectual Property Receiving Office, and claiming priority to KR 10-2021-0004497 filed on Jan. 13, 2021, the disclosures of which are all hereby incorporated by reference herein in their entireties.

BACKGROUND

Field

Various example embodiments relate to an electronic device, and for example, relate to a method for providing a clipboard function and/or an electronic device supporting the same.

Description of Related Art

Recently, with the development of digital technology, electronic devices, such as mobile communication terminals, electronic organizers, smartphones, table PCs, and wearable devices, which are capable of processing communication and personal information while moving have been variously released to the market. With rapid technology development, such electronic devices have had various functions, such as a video call, an electronic organizer function, a document function, an e-mail function, and an Internet function, from a simple voice call and a short message transmission function.

Meanwhile, recently, the electronic device supports a clipboard function capable of copying and pasting certain data. Users may execute a webpage to identify information on a portable electronic device using it, may copy and collect only a necessary area in another place, or may share it with another person to easily collect and share information.

The above-mentioned clipboard function is provided in the form of specifying and storing a copy area to be copied among various pieces of content output on the screen as clip data and copying the stored clip data to another area without change.

However, in such a conventional manner as to operate the clipboard function, a situation where even an area which is not intended by a user is specified as a copy area and is stored as clip data may occur. Thus, a problem where the user should perform an additional edit operation, for example, deleting an unnecessary portion from the copied (or pasted) clip data, may occur.

SUMMARY

Thus, an example embodiment may involve a method for providing a clipboard function to extract and store meaningful content from clip data as at least one additional clip data, when storing the clip data, and recommend the stored at least one additional clip data as a clip target to a user and an electronic device supporting the same.

In accordance with an example embodiment, an electronic device is provided. The electronic device may include a display that displays content, a memory storing data corresponding to the content, and a processor operatively connected, directly or indirectly, with the display and the memory. The processor may be configured to display the content on the display, store at least a partial area of the content as first clip data, in response to a user input associated with copying, generate second clip data different from the first clip data, based on at least a portion of the result of analyzing text or an image for the first clip data, and display a first indicator for the first clip data and a second indicator for the second clip data on the display.

In accordance with another example embodiment, an operation method of an electronic device is provided. The operation method may include displaying content on a display of the electronic device, storing at least a partial area of the content as first clip data, in response to a user input associated with copying, generating second clip data different from the first clip data, based on at least a portion of the result of analyzing text or an image for the first clip data, and displaying a first indicator for the first clip data and a second indicator for the second clip data on the display.

The electronic device according to various example embodiments may extract and store meaningful content from clip data as additional clip data, when storing the clip data, and may recommend the stored additional clip data as a clip target to a user, thus supporting the user to quickly and accurately select desired clip data.

Effects capable of being obtained from the disclosure are not limited to the effects described above.

BRIEF DESCRIPTION OF DRAWINGS

The above and other aspects, features, and advantages of certain example embodiments will be more apparent from the following detailed description, taken in conjunction with the accompanying drawings, in which:

FIGS. 5A(a) and 5A(b) are drawings for describing a situation where an electronic device displays a first indicator and a second indicator according to various example embodiments;

FIGS. 6(a)-6(c) are drawings describing a situation where an electronic device processes an operation corresponding a first indicator and a second indicator according to various example embodiments;

With regard to description of drawings, the same or similar denotations may be used for the same or similar components.

DETAILED DESCRIPTION

Figure 1:
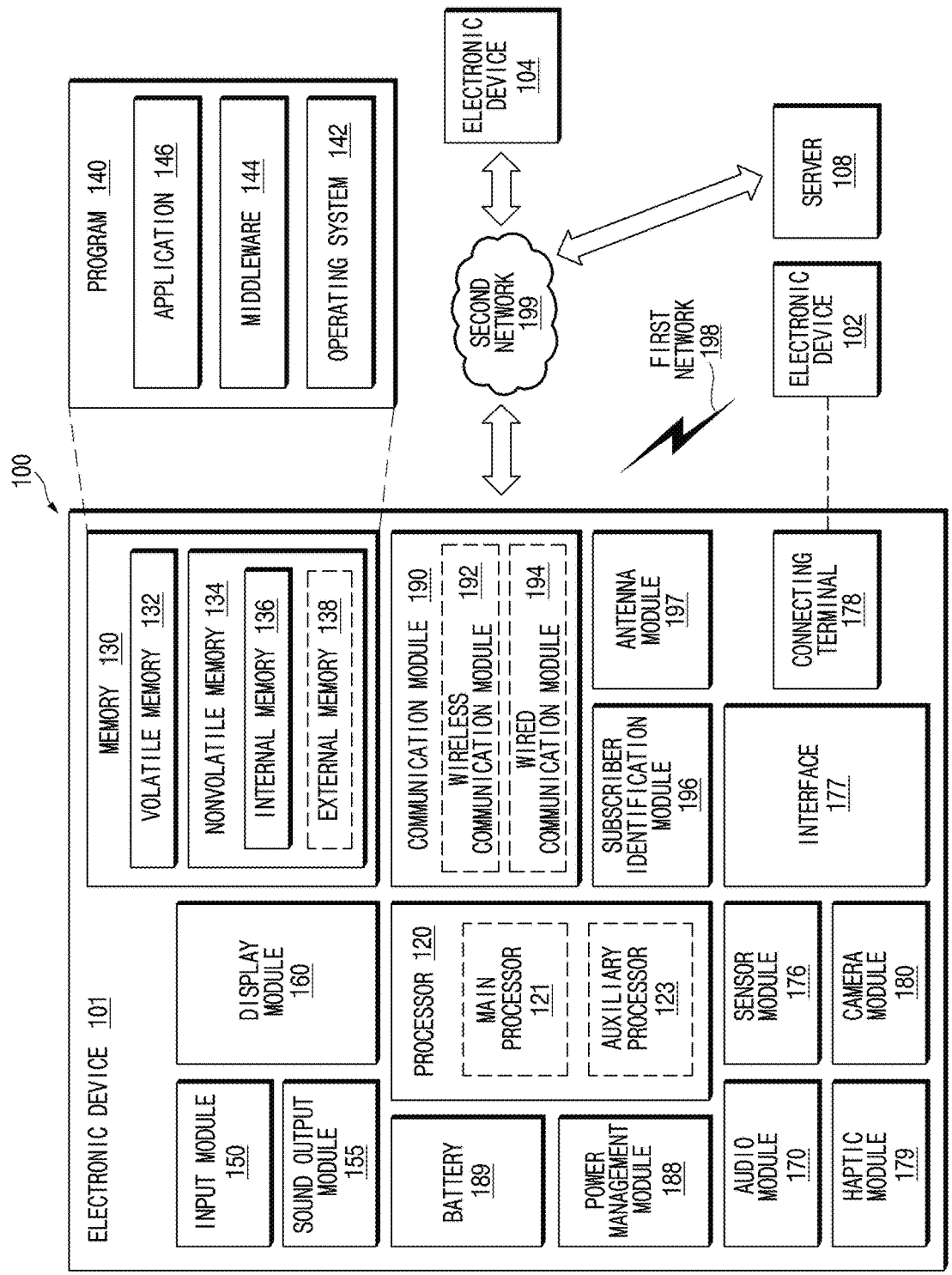
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected, directly or indirectly, with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication c channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
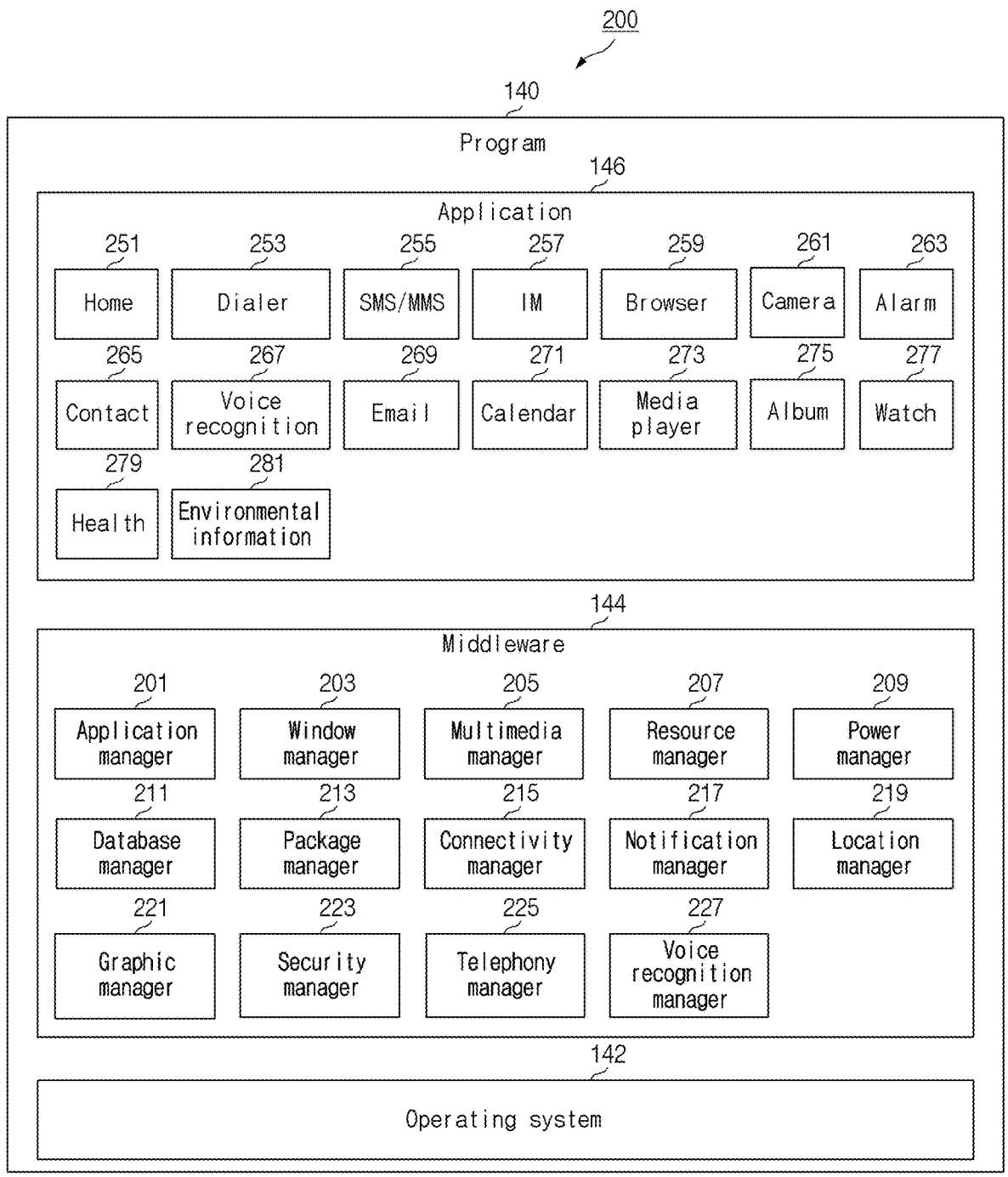
FIG. 2 is a block diagram illustrating a program according to various example embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
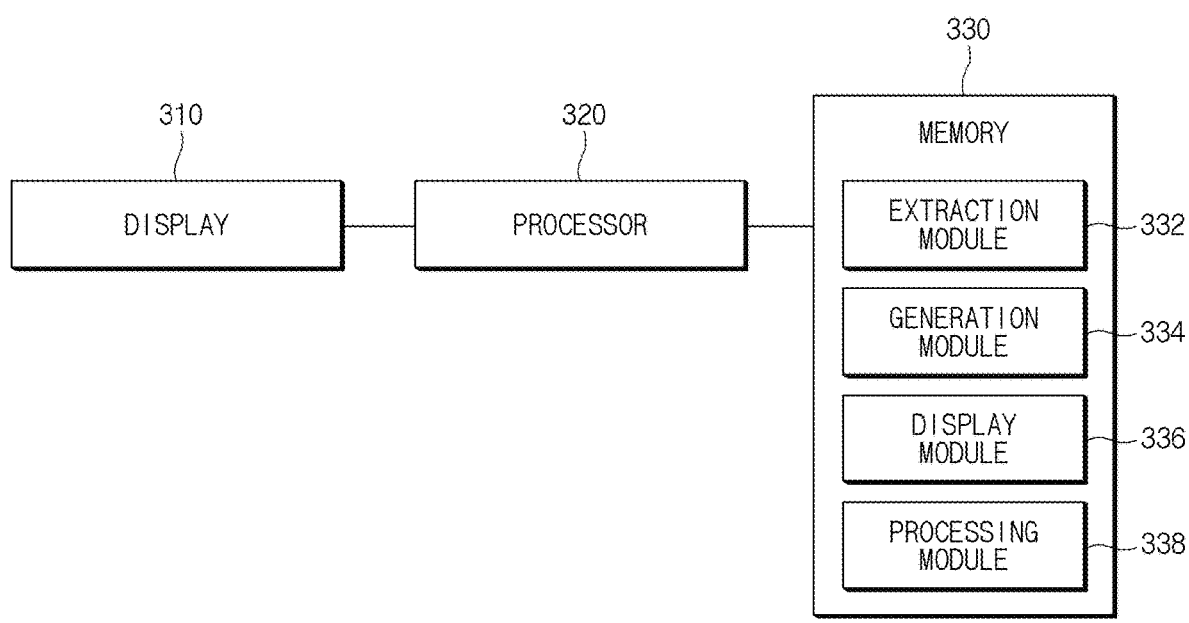
FIG. 3 is a schematic block diagram of an electronic device according to various example embodiments.

FIG. 3 is a schematic block diagram of an electronic device according to various embodiments.

Referring to FIG. 3, an electronic device 300 (e.g., an electronic device 101) may include a display 310 (e.g., a display 160 of FIG. 1), a processor 320 (e.g., a processor 120 of FIG. 1), and a memory 330 (e.g., a memory 130 of FIG. 1). However, this is merely illustrative, and the above-mentioned components are not limited to essential components of the electronic device 300. For example, the electronic device 300 may be implemented to have more components than the components shown in FIG. 3 or have less components than the components shown in FIG. 3. For example, the electronic device 300 may be configured, including an input module (e.g., a touch panel, a hard key, a proximity sensor, a biometric sensor, or the like) or a component of a power supply unit.

According to various embodiments, the display 310 may be in the form of a touch screen. The display 310 may receive, for example, a touch, a gesture, proximity, or a hovering input using an electronic pen or a part of the user's body. The display 310 may display various pieces of content (e.g., an application execution screen or the like) based on control of the processor 320. Such pieces of content may be composed of text and multimedia data such as a still image and a moving image.

According to various embodiments, when the display 310 is in the form of the touch screen, it may receive a user input for selecting at least some of the various pieces of content as a copy area. The user input may be an input for touching at least a portion of content displayed on the display 310 to select the at least a portion of the content as a copy area. Furthermore, the user input may be an input for touching (or specifying) one area and another area of content displayed on the display 310 to select all of content between the one area and the other area as a copy area. However, the input for selecting the copy area is not limited thereto. For example, the user input may be an input for selecting a copy area using a physical key mounted on the electronic device 300 and may be an input for changing an input time for one area of the display 310 to adjust a range of a copy area, for example, for selecting a portion of content as the copy area or selecting the entire content as the copy area.

According various embodiment, the processor 320 may control various components of the electronic device 300. According to an embodiment, the processor 320 may control various types of content to be displayed on the display 310. The content may be displayed on at least a part of the display 310 (e.g., a first area of the display 310), which is occupied by an execution screen of an application.

According to various embodiments, when an input for selecting and copying at least a portion of content as a copy area is received, the processor 320 may store content (e.g., text and/or multimedia data) corresponding to the selected copy area as first clip data (or original clip data). The first clip data may refer to data where the area selected by the received input in at least a partial area of the content is copied. The first clip data may be stored in the memory 330. The stored first clip data may be permanently or temporarily stored before being deleted by a user.

According to various embodiments, the processor 320 may generate at least one second clip data (or additional clip data) based on the first clip data. According to an embodiment, the processor 320 may extract only a portion of content constituting the first clip data, for example, meaningful content to generate second clip data and may store the generated second clip data. For example, in conjunction with generating the second clip data, as will be described below with reference to FIGS. 7 to 10, the processor 320 may perform a text analysis and/or an image analysis for the first clip data. Furthermore, the processor 320 may generate information of predefined meaningful content (e.g., a meaningful content list) and/or an artificial intelligence model (or a learning model) which learns the meaningful content information as training data to generate the second clip data. However, this is merely illustrative, and the disclosure is not limited thereto.

According to an embodiment, the meaningful content which is the basis for generating the second clip data may include personal information, such as an e-mail address, a phone number, a name, an account number, or a schedule included in the first clip data, and/or a date, a time, a sentence, a word, a morpheme, or a specific item (e.g., OPT information) in text. However, this is merely illustrative, and the disclosure is not limited thereto. For example, the meaningful content may include network resource information such as a uniform resource identifier (URI) or a uniform resource locator (URL) included in the first clip data. When image data is included in the first clip data, object information (e.g., an object type and an object name) about an object (e.g., a subject, a background, or the like) included in the image data or information recorded in a code image (e.g., a QR code, a barcode, or the like) included in the image data may also be regarded as the meaningful content. Furthermore, when memo data is included in the first clip data, a memo (e.g., OPT information) where a specific function (e.g., a checklist function for managing specific contents, a function for emphasizing a color or size of the specific contents, or the like) is set by the user may be classified as the meaningful content. As will be described below with reference to FIGS. 7 to 9, the content which is the basis for generating the second clip data may be extracted via at least one of text recognition, image recognition, or video recognition for the first clip data. As another example, when the first clip data is data in the form of a web language such as a hyper text markup language (HTML) and an extensible markup language (XML), the processor 320 may extract a source (e.g., tag) for the first clip data and may extract a still image, a moving image, or sound data from the first clip data based on the extracted source to generate the second clip data.

According to various embodiments, the processor 320 may display a first indicator associated with the first clip data and a second indicator associated with the second clip data. The first indicator may be information for providing a notification that the first clip data is stored, and the second indicator may be information for providing a notification that a portion of the first clip data is stored as the second clip data. Furthermore, the first indicator may be information (e.g., pasting the first clip data) for guiding to run a first application for processing the first clip data, and the second indicator may be information (e.g., pasting the second clip data) for guiding to run a second application for processing the second clip data. For example, the first indicator and the second indicator may be displayed on a second area different from the first area of the display 310. The first area and the second area of the display 310 may be areas divided on the one display 310 and may be areas which overlap with each other. Furthermore, when the electronic device 300 includes a plurality of displays, the first area may be one of the plurality of displays and the second area may be another of the plurality of displays.

According to various embodiments, the processor 320 may process the first clip data or the second clip data based on an input to the first indicator or the second indicator. According to an embodiment, the processor 320 may run the selected application, which is currently running, or another application and may input the first clip data or the second clip data. According to another embodiment, when the application is run after the second clip data is generated, based on properties (e.g., providing an auto fill function) of the run application, the processor 320 may select and display (or recommend) or input the second clip data corresponding to the properties.

According to various embodiments, the memory 330 may store a command or data associated with at least one other component of the electronic device 300. For example, the memory 330 may store data corresponding to content to be displayed on the display 310. Furthermore, the memory 330 may store the first clip data generated based on at least a partial area of the content displayed on the display 310 and the second clip data generated based on the first clip data.

According to various embodiments, the memory 330 may include at least one program module. The program module may include a program 140 of FIG. 1. The at least one program module may include an extraction module 332, a generation module 334, a display module 336 comprising a display, and a processing module 338. However, this is merely illustrative, and the disclosure is not limited thereto. For example, at least one of the above-mentioned modules may be excluded from the components of the memory 330. On the other hand, another module except for the above-mentioned modules may be added to the components of the memory 330. Furthermore, some of the above-mentioned modules may be integrated into another module.

According to an embodiment, the extraction module 332 may include an instruction to extract content for generating the second clip data from the first clip data. According to an embodiment, the generation module 334 may include an instruction to generate the first clip data and the second clip data. According to an embodiment, the display module 336 may include an instruction to display the first indicator associated with the first clip data and the second indicator associated with the second clip data. According to an embodiment, the processing module 338, comprising processing circuitry, may include an instruction to process an operation corresponding to an input to the first indicator or the second indicator. Each "module" herein may comprise circuitry.

Figure 4A:
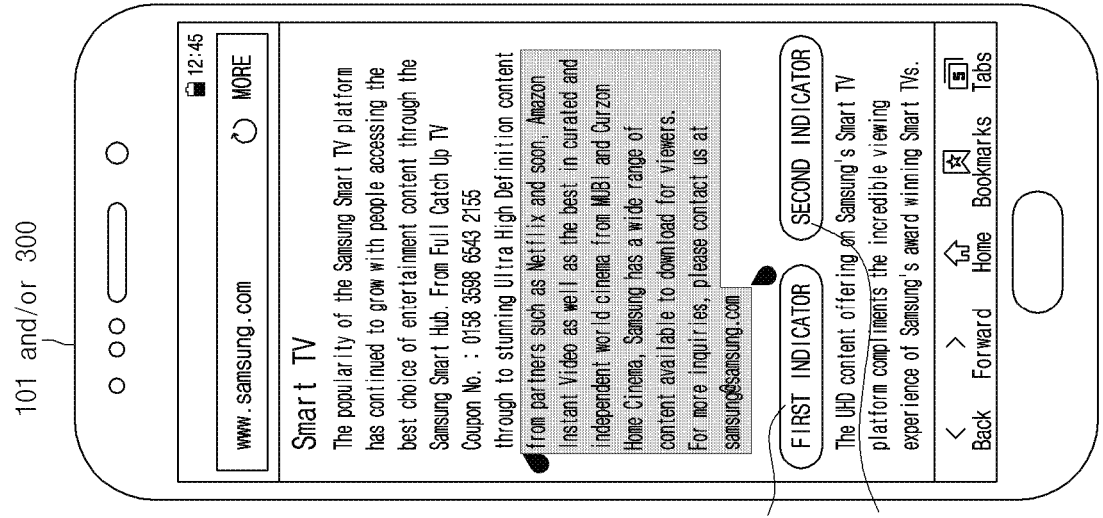
FIGS. 4(a)-4(c) describe a situation where an electronic device generates first clip data and second clip data from content displayed on a display according to various example embodiments.
Figure 4B:
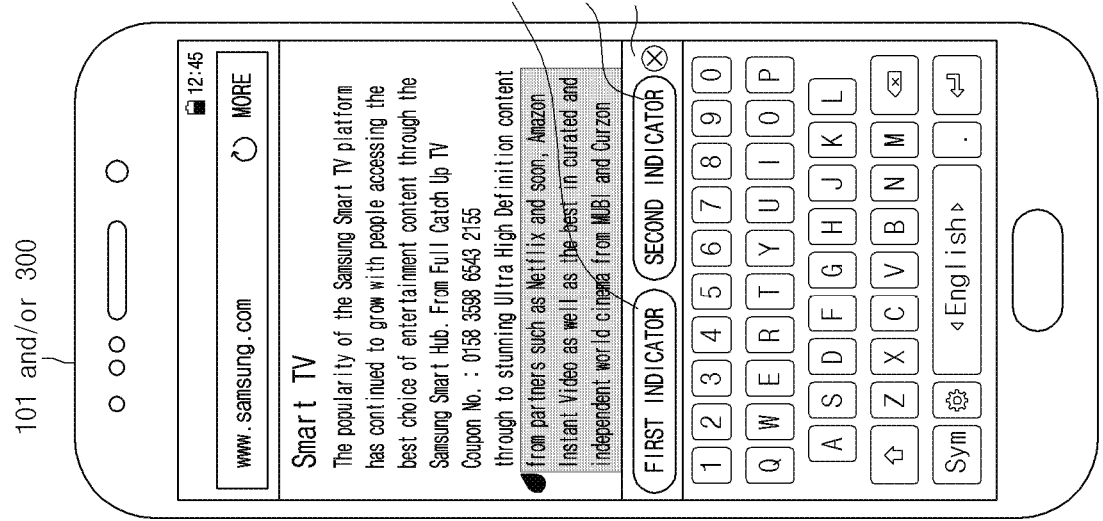
Figure 4C:
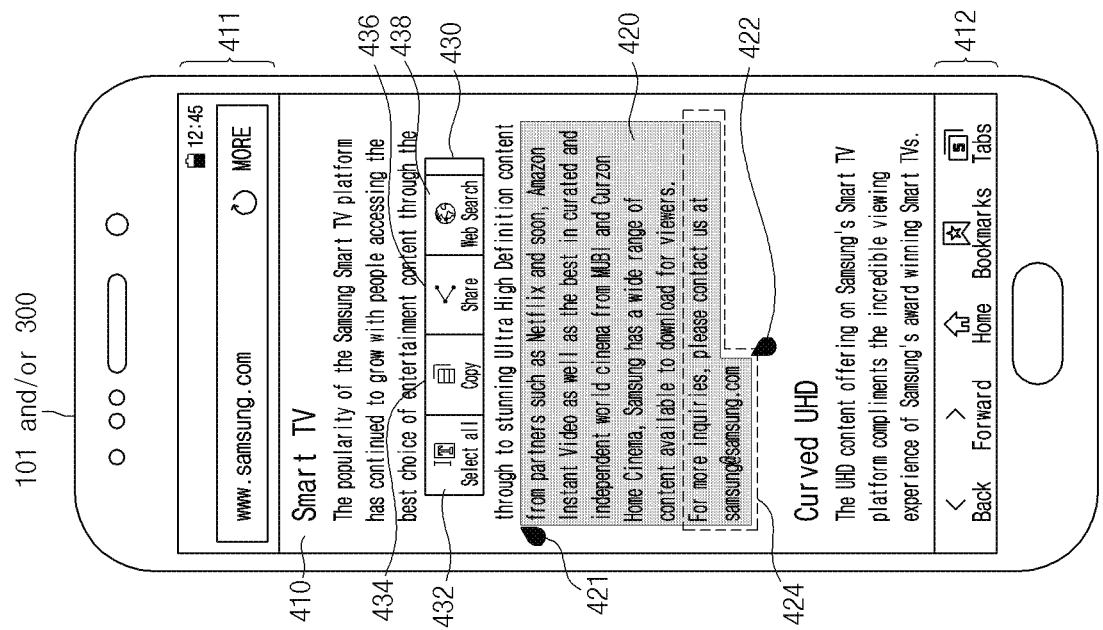

FIGS. 4(a)-4(c) are a drawing for describing a situation where an electronic device generates first clip data and second clip data from content displayed on a display according to various embodiments.

Referring to FIG. 4(a), an electronic device 101/300 (or a processor 320) may display content (e.g., a webpage 410) on a display 310 (e.g., a first area of the display 310). An address of the webpage 410 may be displayed on an upper end 411 of the webpage 410. Page-related function icons capable of moving to another webpage or displaying a previously stored webpage may be displayed on a lower end 412 of the webpage 410. An article composed of various pieces of content may be displayed between the upper end 411 and the lower end 412 of the webpage 410. The various pieces of content may include text and multimedia data such as a still image and a moving image.

According to various embodiments, the electronic device 101/300 may receive an input for selecting a portion of the displayed content as a copy area 420. For example, a user may select a portion of the content displayed on the display 310 as the copy area 420 using a touch or a physical key.

In detail, the user may select some of text and/or images displayed on the webpage 410 as the copy area 420. The electronic device 101/300 may differently display an area which is selected as the copy area 420 and an area which is not selected as the copy area 420 in the webpage 410. For example, the electronic device 300 may differently display a text color of the copy area 420 or may differently display background color of the selected copy area 420.

According to various embodiments, the electronic device 101/300 may display UI elements 421 and 422 capable of specifying the copy area 420. The user may adjust a range corresponding to the copy area 420 while moving the UI elements 421 and 422.

According to various embodiments, when the copy area 420 is selected from content (e.g., the webpage 410), the electronic device 101/300 may display function icons 430 capable of executing a predetermined function. For example, the electronic device 101/300 may display an icon 432 for expanding the selected copy area to the entire content, an icon 434 for copying the selected copy area, an icon 436 associated with a sharing function of the selected copy area, and an icon 438 for searching a web server for information associated with the selected copy area. However, this is not limited thereto. The electronic device 101/300 may further display function icons capable of executing predetermined another function other than the above-mentioned icons.

According to various embodiments, when the icon 434 for copying the selected copy area is selected in the state where the copy area 420 is selected, the electronic device 101/300 may copy the selected copy area 420 to generate first clip data. The first clip data may refer to copying data corresponding to the selected copy area 420 among data (e.g., text, a still image, a moving image, or the like) constituting the displayed webpage 410.

According to various embodiments, while the first clip data is generated or when the first clip data is generated, the electronic device 300 may generate at least one second clip data based on the first clip data. As described above, a portion (e.g., an e-mail address or a sentence 424 including the e-mail address) of data (e.g., text) constituting the first clip data may be extracted and generated as the second clip data. Such second clip data may also be continuously or temporarily stored in a memory 330 before being deleted by the user.

Referring to FIG. 4(b), the electronic device 101/300 may display a first indicator 450 (e.g., pasting the first clip data) associated with the first clip data and a second indicator 460 (e.g., pasting the second clip data) associated with the second clip data on a display 310 (e.g., a second area 440 of the display 310). For example, the second area 440 of the display 310 may be a part of a text input keypad displayed on the display 310. For example, the first indicator 450 and the second indicator 460 may also be displayed in response to the output of the text input keypad. As another example, referring to FIG. 4(c), the first indicator 450 and the second indicator 460 of the display 310 may be displayed on the second area displayed in the form of a separate pop-up window to be adjacent to the copy area 420. As another example, when the icon 434 for copying the selected copy area is selected in the state where the text input keypad is output, the first indicator 450 and the second indicator 460 may be displayed on at least a partial area of the output text input keypad. According to an embodiment, when pieces of a plurality of second clip data are generated, in conjunction with displaying the first indicator 450 and the second indicator 460, the electronic device 101/300 may display the second indicator 460 based on properties of content (e.g., an application which is running) displayed on the electronic device 101/300. For example, when a phone number, a date, a time, and a web URL are generated as the second clip data in the situation where the webpage 410 is displayed, the electronic device 300 may display the second indicator associated with the web URL capable of being accessed through the webpage 410 in order of priority. For another example, when a phone number, a date, a time, and a web URL are generated as the second clip data in the situation where a dial screen is displayed, the electronic device 101/300 may display the second indicator associated with the phone number in order of priority. At this time, alternatively or additionally, the electronic device 101/300 may process the second indicator having a first priority and the second indicator having a second priority in response to an input to be alternatively displayed.

As such, the electronic device 101/300 may extract and display (or recommend) some content from the first clip data as the second clip data, such that a user selects and uses only desired data from the first clip data as a clip target without an edit operation for the first clip data (e.g., an operation of deleting a portion of the first clip data).

FIGS. 5A(a)-5A(b) and 5B(a)-5B(b) are drawings for describing a situation where an electronic device displays a first indicator and a second indicator according to various embodiments.

Referring to FIGS. 5A(a) and 5A(b), an electronic device 101/300 (or a processor 320) may display one of a first indicator or a second indicator on a display 310, for example, a second area of the display 310. In this case, the electronic device 300 may process the first indicator and the second indicator to be alternately displayed, based on a user input.

According to various embodiments, as described above, the second area of the display 310 may be a part of a text input keypad. As described, the text input keypad may be composed of an input area 501 including respective input elements for inputting a number, Hangul, an alphabet, and a symbol and a toolbar area 503 for providing an additional function of the text input keypad (e.g., entering a setting mode, displaying recent input text information, displaying emoticon information, or the like). The electronic device 300 may specify at least a portion of the toolbar area 503 as the second area of the display 310 for displaying the first indicator and/or the second indicator. However, this is not limited thereto. At least a portion of the input area 501 may be specified as the second area of the display 310.

According to various embodiments, as shown in FIG. 5A(a), the electronic device 300 may display one of the first indicator or the second indicator together with an indicator switching icon 510 to switch the displayed indicator on the second area of the display 310. For example, as shown, the first indicator 520 may be displayed on the second area of the display 310 together with the indicator switching icon 510.

According to various embodiments, when an input 512 to the indicator switching icon 510 is received, the electronic device 300 may switch the currently displayed indicator to another indicator. For example, as shown in FIG. 5A(b), the currently displayed first indicator 520 may switch to the second indicator 530 in response to the input 512 to the indicator switching icon 510. Repeatedly, an indicator displayed in response to the additional input 512 to the indicator switching icon 510 may switch to the first indicator 520 again. As another example, when there are a plurality of second indicators, the plurality of second indicators may be sequentially displayed, in response to the additional input 512 to the indicator switching icon 510.

Figure 5B:
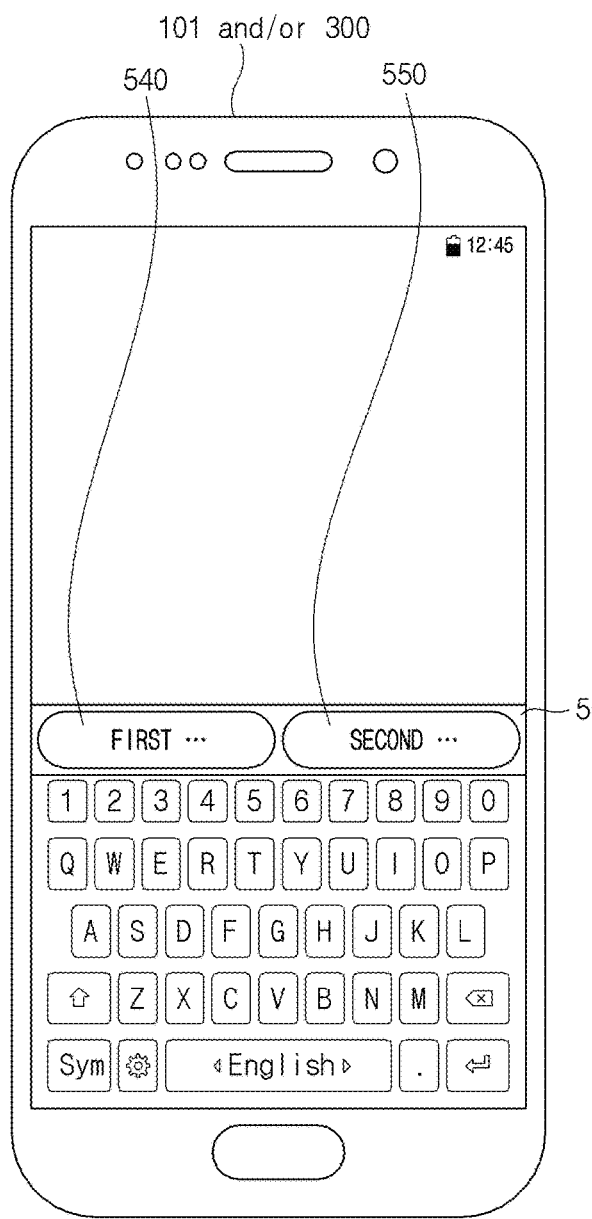
FIGS. 5B(a) and 5B(b) are drawings describing another situation where an electronic device displays a first indicator and a second indicator according to various example embodiments.
Figure 5B:
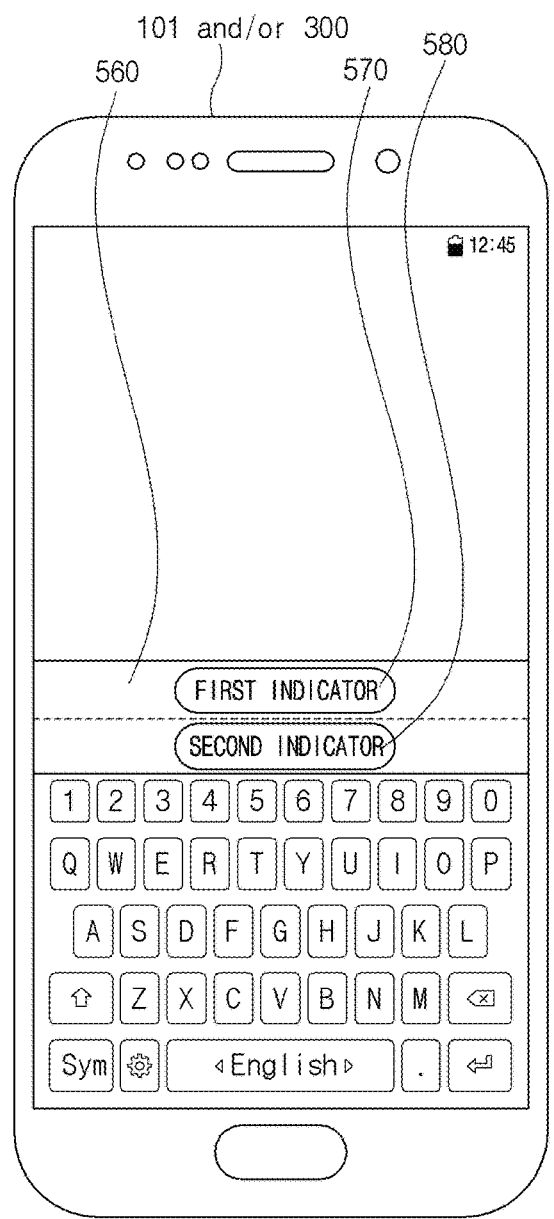

Referring to FIGS. 5B(a) and 5B(b), the electronic device 101/300 may display a first indicator 540 and at least one second indicator 550 together on the display 310. For example, as shown in FIG. 5B(a), the electronic device 300 may display the first indicator 540 and the at least one second indicator 550 on a second area with a fixed size (e.g., the toolbar area 503). At this time, a size of an indicator displayed by the fixed size of the toolbar area 503 may be limited. Thus, the electronic device 300 may determine a size of each indicator which is displayed, based on the number of the displayed indicators and the size of the toolbar area 503 and may reduce and display each indicator to correspond to the determined size.

As another example, as shown in 5B(b), the electronic device 300 may display a first indicator 570 and at least one second indicator 580 on a second area (e.g., a toolbar area 560) of the display 310 capable of being expanded in size. At this time, each indicator may be displayed in a state where it is not reduced, irrespective of the number of the displayed indicators, by the size of the toolbar area 560, which is varied (e.g., expanded) in response to the number of the indicators.

FIGS. 6(a)-6(c) are a drawing for describing a situation where an electronic device processes an operation corresponding a first indicator and a second indicator according to various embodiments.

As shown in FIG. 6(a), an electronic device 101/300 may display a first indicator 610 associated with first clip data and a second indicator 620 associated with second clip data on a display 310. As described above, the first clip data may be a portion (e.g., text) specified as a copy area in content displayed on the display 310, and the second clip data may be a portion (e.g., an e-mail address) extracted from the first clip data. Furthermore, the first indicator 610 may generate a command to paste the first clip data into another area, and the second indicator 620 may generate a command to paste the second clip data into another area.

According to various embodiments, the electronic device 300 may perform a specified operation in response to an input to the first indicator 610 or the second indicator 620.

According to an embodiment, when an input for selecting the first indicator 610 associated with the first clip data composed of text is received, as shown in FIG. 6(b), the electronic device 300 may display an execution screen 630 of a note application capable of processing the first clip data. At this time, when stored at least one note 632 is selected or it is requested to write a new note on the note application, the electronic device 300 may automatically enter the first clip data into the selected note or the new note.

According to an embodiment, when an input for selecting the second indicator 620 associated with the second clip data composed of an e-mail address is received, as shown in FIG. 6(c), the electronic device 300 may display an execution screen 640 of an e-mail application capable of processing the second clip data. At this time, the electronic device 300 may automatically enter the second clip data into an e-mail application caller area 642.

Figure 7:
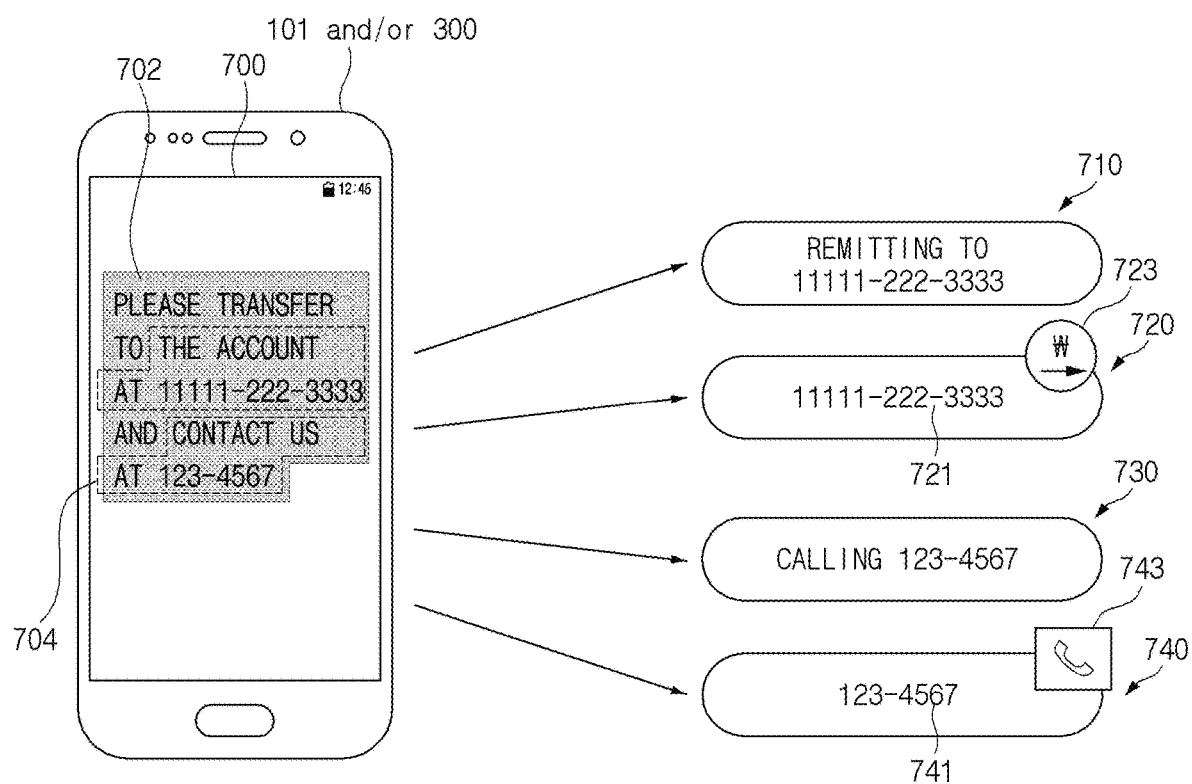
FIG. 7 is a drawing for describing a situation where an electronic device generates a second indicator according to various example embodiments.

FIG. 7 is a drawing for describing a situation where an electronic device generates a second indicator according to various embodiments.

Referring to FIG. 7, an electronic device 101/300 (or a processor 320) may display content 700 composed of text on a first area of a display 310. Furthermore, the electronic device 300 may receive an input for selecting (or specifying) a portion of the displayed content 700 as a copy area. For example, an input for selecting "transfer to the account at 11111-222-3333 and contact us at 123-4567" excluding "Please" in the content 700, "Please transfer to the account at 11111-222-3333 and contact us at 123-4567" may be received and stored as first clip data.

According to various embodiments, the electronic device 300 may generate at least one second clip data based on the first clip data. For example, the electronic device 300 may extract only a portion of content 700 constituting the first clip data, for example, meaningful content to generate the at least one second clip data. For example, the electronic device 300 may extract the account number, "11111-222-3333", 702 and the phone number, "123-4567", 704 as meaningful content from the first clip data. In this regard, the electronic device 300 may perform an operation of analyzing the content 700 composed of text (e.g., analyzing text). For example, the electronic device 300 may analyze the first clip data in a certain unit (e.g., in units of morphemes) and may extract meaningful content. As another example, the electronic device 300 may analyze the first clip data and may determine emotion (or sensibility) of a specific user. For example, the electronic device 300 may determine an emotion such as joy, anger, sadness, or pleasure of the specific user via the first clip data and may generate at least a portion of the determined result as the second clip data. As another example, the electronic device 300 may analyze the first clip data to analyze an intention (e.g., question, command, rejection, acceptance, or the like) of the specific user and may generate an operation corresponding to at least a portion of the analyzed result or the analyzed result as the second clip data.

According to various embodiments, the electronic device 300 may generate a second indicator associated with the second clip data, based on the generated second clip data.

According to an embodiment, the electronic device 300 may generate the extracted content itself as the second indicator. For example, the account number, "11111-222-3333", and the phone number, "123-4567", which are stored as the second clip data, may be generated as the second indicator and may be displayed on a screen.

According to another embodiment, the electronic device 300 may process the second clip data to generate the second indicator. The electronic device 300 may derive a user action for processing the extracted content via text recognition and may generate the second indicator in which the second clip data and the action are combined with each other. For example, the electronic device 300 may derive a remittance action based on the extracted account number or a word (e.g., transfer) before and after the account number. Thus, a second indicator 710 composed of text to guide to remit to a corresponding account number (e.g., remitting to 11111-222-3333) (721) or a second indicator 720 to which a graphic effect 723 meaning account remittance is applied may be generated and displayed on a screen. As another example, the electronic device 300 may derive an outgoing action based on the extracted phone number or a word (e.g., contact) before and after the phone number. Thus, a second indicator 730 composed of text to guide to make a call to a corresponding phone number (e.g., calling 123-4567) (741) or a second indicator 740 to which a graphic effect 743 meaning outgoing is applied may be generated and displayed on the screen.

According to various embodiments, the electronic device 300 may display the processed second indicator. According to an embodiment, at least one of the second indicator 710 or the second indicator 720 associated with the account number may be displayed together with at least one of the second indicator 730 or the second indicator 740 associated with the phone number. At this time, the electronic device 300 may perform an additional operation (or an additional processing operation) of determining and displaying a priority of the displayed second indicator based on an input pattern of the user and/or properties of an application which is running. At this time, alternatively or additionally, the electronic device 300 may process the second indicator having a first priority and the second indicator having a second priority in response to an input to be alternatively displayed.

Figure 8:
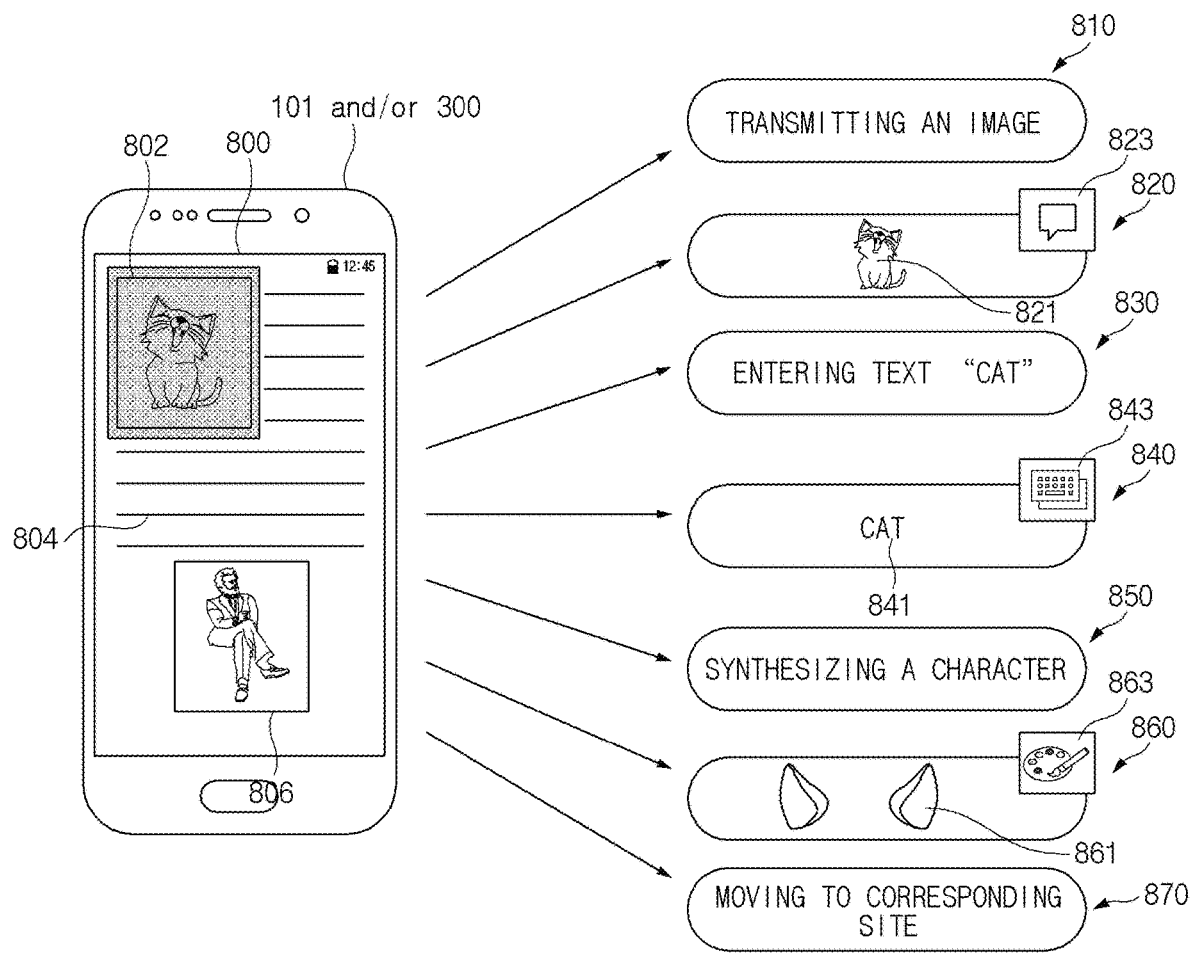
FIG. 8 is a drawing for describing another situation where an electronic device generates a second indicator according to various example embodiments.

FIG. 8 is a drawing for describing another situation where an electronic device generates a second indicator according to various embodiments.

Referring to FIG. 8, an electronic device 101/300 (or a processor 320) may display content 800 composed of text 804 and still images 802 and 806 on a first area of a display 310. Furthermore, the electronic device 300 may receive an input for selecting (or specifying) a portion of the displayed content 800 as a copy area. For example, the one still image 802 included in the content 800 may be selected as a copy area and may be stored as first clip data.

According to various embodiments, the electronic device 300 may generate at least one second clip data based on the first clip data. In this regard, the electronic device 300 may perform an operation of analyzing the content 800 composed of the still image (e.g., analyzing an image). According to an embodiment, the electronic device 300 may obtain and generate a thumbnail image in which horizontal and vertical sizes of the first clip data are reduced or resolution of the first clip data is reduced as second clip data. According to another embodiment, the electronic device 300 may recognize an object included in the first clip data (e.g., the still image) and may obtain and generate information about the recognized object (e.g., an object type) as the second clip data. In this regard, the electronic device 300 may recognize a person, a part of the person's body, an animal, food, or the like included in the first clip data as an object. For example, a part (e.g., a face, an eye, a nose, a mouth, a hand, a leg, or the like) which is enlarged in a certain level (e.g., in which an extreme close-up, a close-up, or a big close-up is taken) on the first clip data may be recognized as an object. Furthermore, a portion including a part of the body together with a face on the first clip data may be recognized as an object. Furthermore, an object (e.g., a person, an animal, a flower, food, or the like) with a certain size (25%) on the first clip data may be recognized.

As another example, the electronic device 300 may recognize an object capable of estimating a landscape or a specific place (e.g., a house, a restaurant, a company, or the like) included in the first clip data. For example, a landscape including a relatively large range (e.g., a long shot) such as a sandy beach or a beach on the first clip data may be recognized as an object. Furthermore, an object which is smaller than a certain size or is distributed greater than or equal to a certain range (e.g., 25%) of the first clip data on the first clip data may be recognized as a landscape. Furthermore, the electronic device 300 may analyze the displayed content 800 and may obtain and generate address information of a web server which stores the first clip data as the second clip data.

According to various embodiments, the electronic device 300 may generate a second indicator associated with the second clip data, based on the generated second clip data.

According to an embodiment, the electronic device 300 may use the second clip data itself as the second indicator. For example, the thumbnail image, the object information, the portion of the object, or the address of the web server, which is generated as the second clip data, may be used as the second indicator and may be displayed on the screen.

According to another embodiment, the electronic device 300 may process the second clip data to generate the second indicator. The electronic device 300 may derive a user action for processing the second clip data, based on the generated second clip data, and may generate the second indicator in which the second clip data and the action are combined with each other. For example, the electronic device 300 may derive an image transmission action based on the second clip data generated by the thumbnail image. Thus, a second indicator 810 composed of text for guiding to transmit the second clip data (e.g., transmitting an image) or a second indicator 820 to which a thumbnail image 821 and a graphic effect 823 meaning message transmission are applied may be generated and displayed on a screen. As another example, the electronic device 300 may derive a text input action based on the second clip data generated by the object information (e.g., the object type). Thus, a second indicator 830 composed of text for guiding to enter text (e.g., entering text 'cat') and a second indicator 840 to which object information 841 and a graphic effect 843 meaning text input are applied may be generated and displayed on the screen.

As another example, the electronic device 300 may derive an image synthesis action based on the second clip data generated by a part (e.g., a face, a leg, an ear, an eye, a nose, or the like) of an object (e.g., an animal). Thus, a second indicator 850 composed of text for guiding to synthesize an image (e.g., synthesizing a character) and a second indicator 860 to which the obtained portion 861 of the object and a graphic effect 863 meaning character synthesis are applied may be generated and displayed on the screen. As another example, the electronic device 300 may generate and display a second indicator 870 composed of text for guiding to access a web address on the screen, based on the second clip data generated by address information of a web server.

Figure 9:
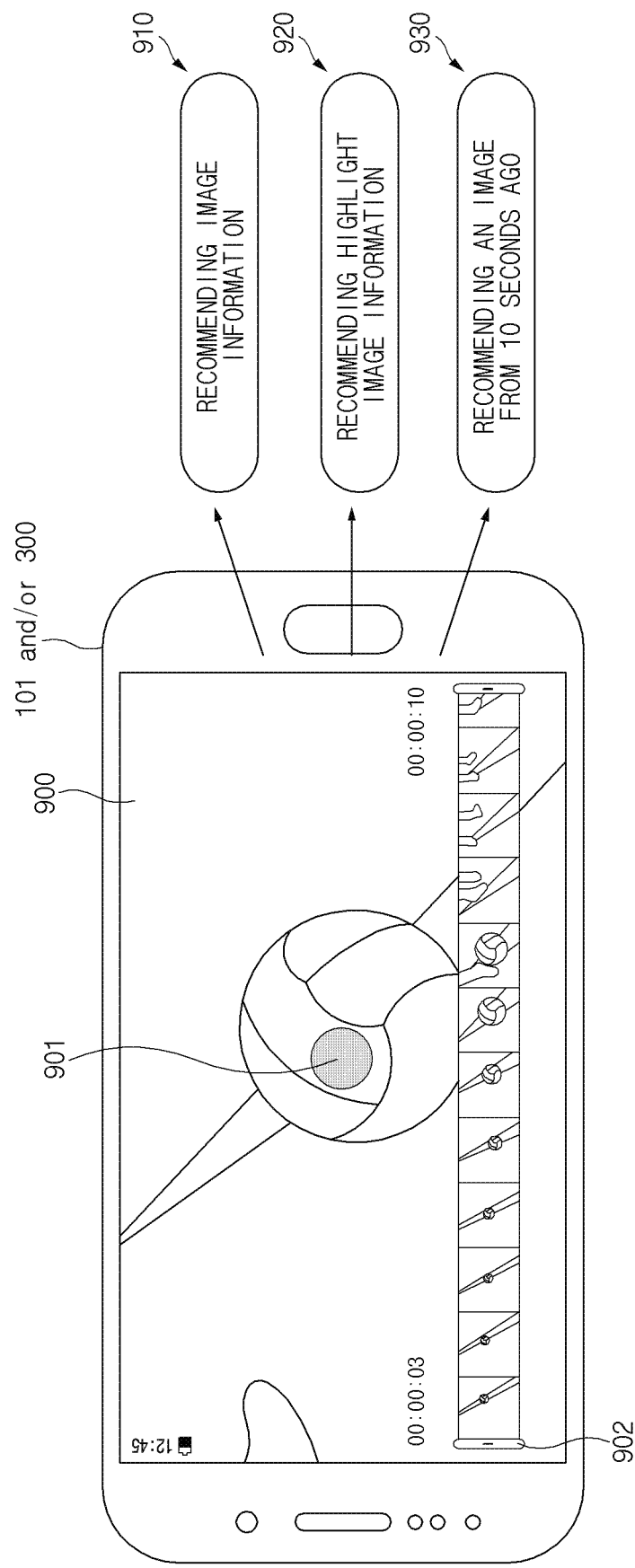
FIG. 9 is a drawing for describing another situation where an electronic device generates a second indicator according to various example embodiments.

FIG. 9 is a drawing for describing another situation where an electronic device generates a second indicator according to various embodiments.

Referring to FIG. 9, an electronic device 101/300 (or a processor 320) may display content 900 composed of a plurality of frames of a display 310. Furthermore, the electronic device 300 may receive an input 901 for selecting (or specifying) some frames of the displayed content 900 as a copy area. For example, one frame included in the content 900 may be selected as a copy area and may be stored as first clip data.

According to various embodiments, the electronic device 300 may generate at least one second clip data based on the first clip data. In this regard, the electronic device 300 may perform an operation of analyzing the content 900 (e.g., analyzing an image, analyzing an audio, or the like).

According to an embodiment, the electronic device 300 may obtain and generate content information, such as a title of the content 900 or address information of a web server which stores the content 900, as second clip data. According to another embodiment, the electronic device 300 may output a playback bar 902 where a specified number of frames are continuously arranged with respect to a time point when the first clip data is generated and may generate at least one frame meeting a specified condition among the frames included in the playback bar 902 as the second clip data. The specified condition may include intensity of a sound or whether a specified word is included.

According to various embodiments, the electronic device 300 may generate a second indicator associated with the second clip data, based on the generated second clip data.

According to an embodiment, the electronic device 300 may use the second clip data itself as the second indicator. For example, the title of the content 900 or the address information of the web server which stores the content 900, which is generated as the second clip data, may be used as the second indicator and may be displayed on a screen.

According to another embodiment, the electronic device 300 may process the second clip data to generate the second indicator. The electronic device 300 may generate and display second indicators 910, 920, and 930 for guidance on a user action for processing the second clip data on a screen, based on the generated second clip data.

For example, the electronic device 300 may generate the second indicator 910 composed of text for guiding to recommend content information (e.g., recommending image information), based on the second clip data generated by the content information.

As another example, the electronic device 300 may generate some of all frames included in the content, for example, a highlight image as the second clip data. A still image of at least one of all frames included in the image may be randomly selected as the highlight image, or a frame including a specified specific object or a frame where motion of the specific object is greater than or equal to a certain magnitude may be selected as the highlight image. In this case, the electronic device 300 may generate the second indicator 920 for guiding to recommend the highlight image (e.g., recommending highlight image information) or a second indicator for displaying the highlight image in the form of a thumbnail.

As another example, the electronic device 300 may generate some of all frames included in the content, an image before a certain time (e.g., an image from 10 seconds ago) with respect to a time point when the first clip data is generated, as the second clip data. In this case, the electronic device 300 may generate the second indicator 930 composed of text for guiding to recommend the image from 10 seconds ago (e.g., recommending the image from 10 seconds ago) or a second indicator for displaying the image from 10 seconds ago in the form of a thumbnail.

According to various embodiments, the electronic device 300 may process the second clip data based on a user input to the second indicator. According to an embodiment, the electronic device 300 may display the second clip data (e.g., the image information, the highlight image, or the image from 10 seconds ago) corresponding to the selected second indicator via an application which is currently running or by running another application.

An electronic device (e.g., an electronic device 101/300) according to various embodiments may include a display (e.g., a display 310) for displaying content, a memory (e.g., a memory 330) storing data corresponding to the content, and a processor (e.g., a processor 320) operatively connected, directly or indirectly, with the display and the memory. According to an embodiment, the processor may be configured to display the content on the display, store at least a partial area of the content as first clip data, in response to a user input associated with copying, generate second clip data different from the first clip data, based on at least a portion of the result of analyzing text or an image for the first clip data, and display a first indicator for the first clip data and a second indicator for the second clip data on the display.

According to various embodiments, the processor may be configured to display the content on a first area of the display and display the first indicator and the second indicator on a second area of the display, the second area being different from the first area.

According to various embodiments, the second area of the display may include at least a part of a text input keypad including at least one text input element.

According to various embodiments, the processor may be configured to display a text input keypad including at least one text input element to overlap with at least a portion of the content, in response to generating (or storing) the second clip data and separate and display the first indicator and the second indicator from the at least one text input element. For example, the at least one text input element may include at least one of a number, Hangul, an alphabet, or a symbol.

According to various embodiments, the processor may be configured to run an application associated with the first clip data or the second clip data, in response to an input for selecting the first indicator or the second indicator.

According to various embodiments, the processor may be configured to display the first clip data or the second clip data selected by the input on an execution screen of the application.

According to various embodiments, the first clip data may be in the form of text. The processor may be configured to generate the second clip data composed of some text of the first clip data.

According to various embodiments, the some text of the first clip data may include at least one of an e-mail address, a phone number, a name, an account number, a schedule, a uniform resource identifier (URI), and a uniform resource locator (URL) included in the first clip data.

According to various embodiments, the first clip data may be in the form of an image. The processor may be configured to generate the result of recognizing at least one object included in the first clip data as the second clip data.

According to various embodiments, the result of recognizing the at least one object may include at least one of an object type and an object name.

Figure 10:
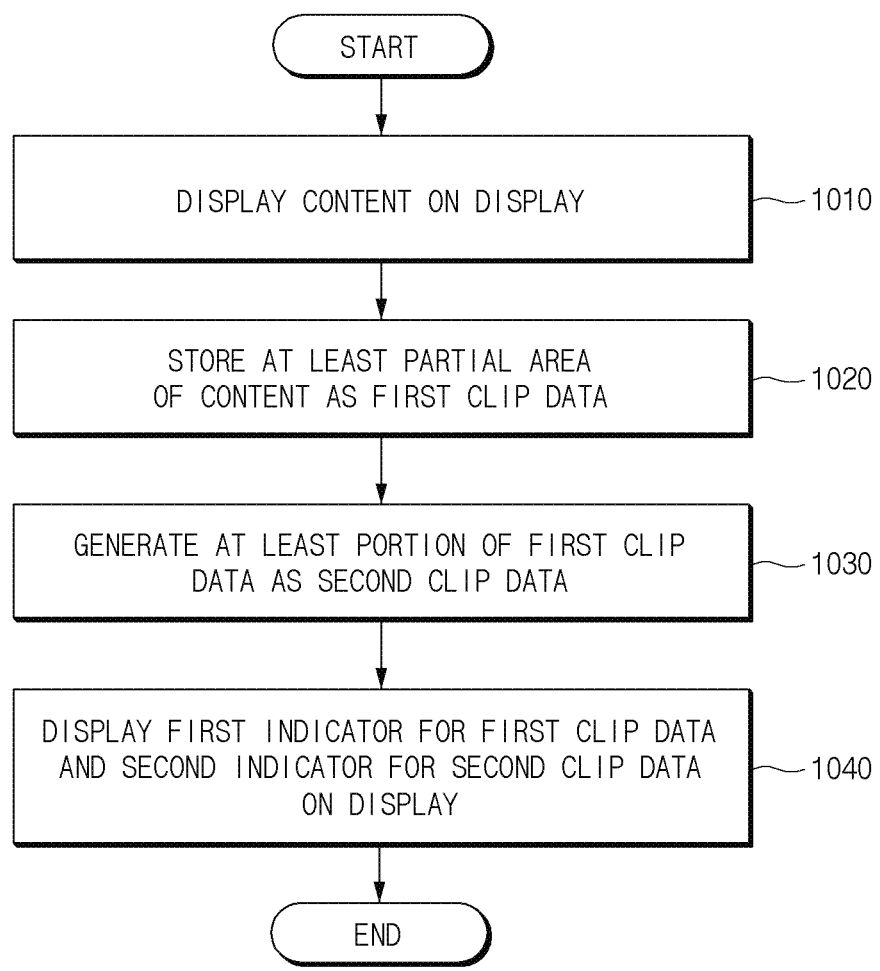
FIG. 10 is a flowchart illustrating an operation where an electronic device provides a clipboard function according to various example embodiments.

FIG. 10 is a flowchart illustrating an operation where an electronic device provides a clipboard function according to various embodiments.

Referring to FIG. 10, in operation 1010, an electronic device 300 (or a processor 320) according to various embodiment may display content on a display 310 (e.g., a first area of the display 310). The content may be an execution screen of an application. The first area of the display 310 may be at least a portion of the display 310, which is occupied by the execution screen.

According to various embodiments, in operation 1020, the electronic device 300 may store at least a partial area of the content as first clip data (or original clip data). According to an embodiment, the electronic device 300 may select at least a portion of the content as a copy area and may store content (e.g., text and/or multimedia data) corresponding to the selected copy area as the first clip data.

According to various embodiments, in operation 1030, the electronic device 300 may generate at least a portion of the first clip data as second clip data. As described above with reference to FIGS. 7 to 9, the second clip data may be meaningful content extracted from content constituting the first clip data. The meaningful content may include at least one of personal information, such as an e-mail address, a phone number, a name, or an account number included in the first clip data, network resource information, such as a uniform resource identifier (URI) or a uniform resource locator (URL) included in the first clip data, or information about a type and a name of an object (e.g., a subject, a background, or the like) included in the first clip data.

According to an embodiment, the electronic device 300 may learn an artificial neural network depending on a machine learning algorithm and may extract meaningful content from the first clip data using a learning model. For example, the electronic device 300 may generate a learning model by learning the artificial neural network by using information of predefined meaningful content (e.g., domain list information for each country) as training data and may classify and generate an e-mail address from the first clip data as the second clip data using such a learning model.

According to another embodiment, the electronic device 300 may analyze an image included in the first clip data to classify an object (e.g., a person, a body part, a background, a building, an animal, a plant, food, a tree, a thing, or the like) and may obtain and generate information associated with the classified object through the inside or outside of the electronic device 300 as the second clip data.

According to various embodiments, in operation 1040, the electronic device 300 may display a first indicator associated with the first clip data and a second indicator associated with the second clip data on the display 310. The first indicator may be information for providing a notification that the first clip data is stored, and the second indicator may be information for providing a notification that a portion of the first clip data is stored as the second clip data. Furthermore, the first indicator may be information (e.g., pasting the first clip data) for guiding to run a first application for processing the first clip data, and the second indicator may be information (e.g., pasting the second clip data) for guiding to run a second application for processing the second clip data. For example, the first indicator and the second indicator may be displayed on a second area different from the first area of the display 310.

According to various embodiments, when detecting a user input to the first indicator or the second indicator, the electronic device 300 may process the first clip data or the second clip data corresponding to the selected indicator. For example, the electronic device 300 may display an execution screen of an application for processing the selected indicator and may display (or input) clip data corresponding to the selected indicator on at least a portion of the execution screen.

Figure 11:
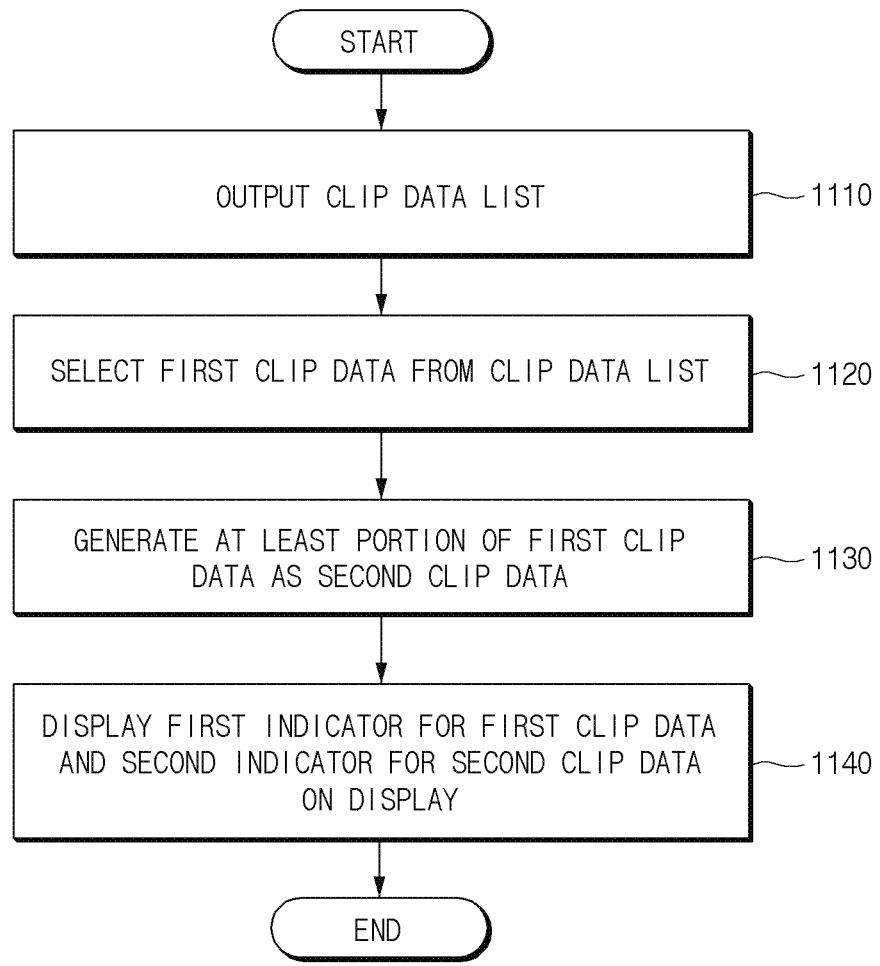
FIG. 11 is a flowchart illustrating another operation where an electronic device provides a clipboard function according to various example embodiments.
Figure 12A:
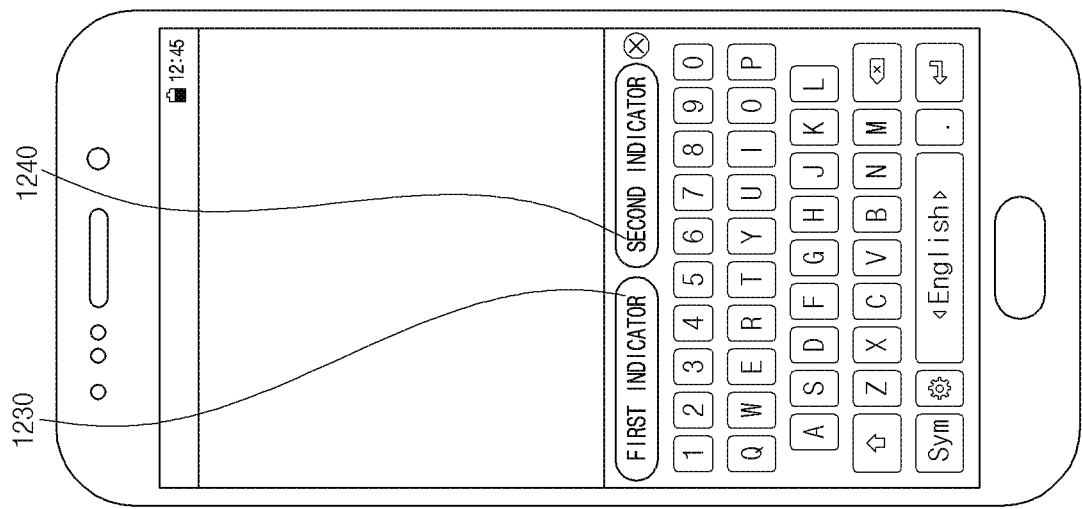
FIGS. 12(*a*)-12(*c*) are drawings describing another operation where an electronic device provides a clipboard function according to various example embodiments.
Figure 12B:
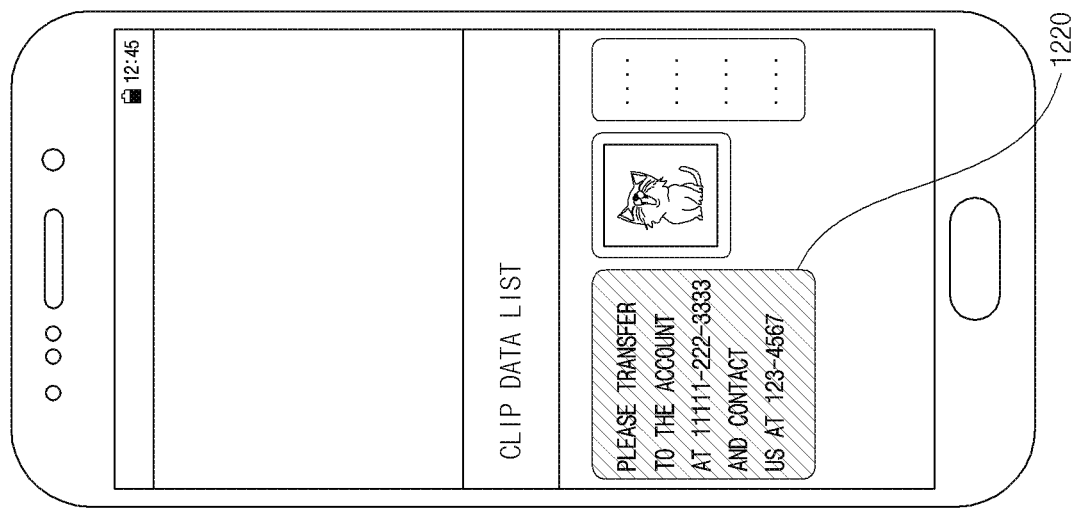
Figure 12C:
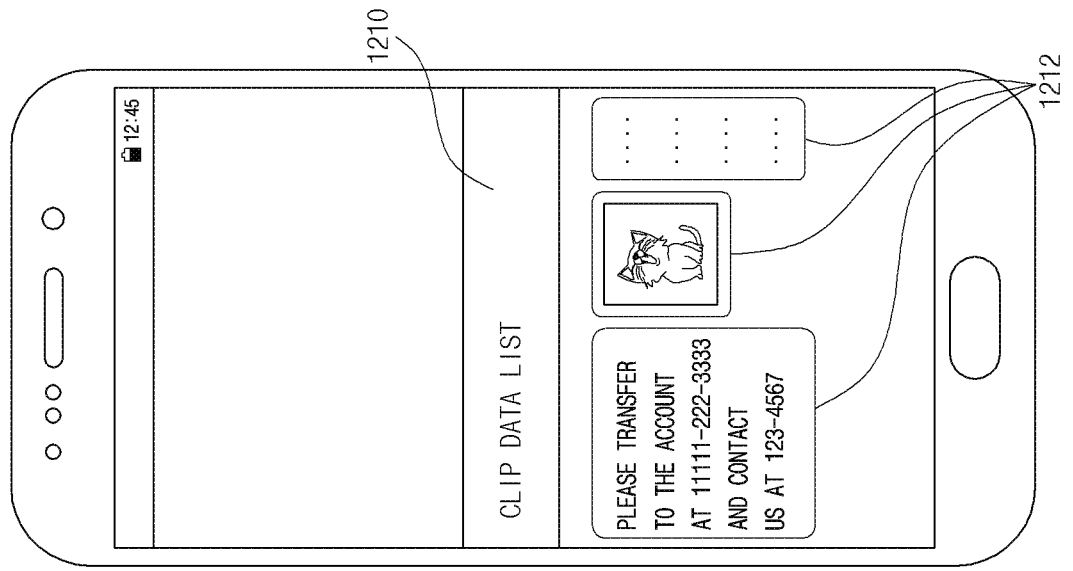

FIG. 11 is a flowchart illustrating another operation where an electronic device provides a clipboard function according to various embodiments. FIGS. 12(a)-12(c) are a drawing for describing another operation where an electronic device provides a clipboard function according to various embodiments.

Referring to FIG. 11, in operation 1110, an electronic device 300 (or a processor 320) according to various embodiments may output a clip data list. As shown in FIG. 12(a), a clip data list 1210 may be information where identifiers of pieces of first clip data 1212 previously stored in a memory 330 are listed.

According to various embodiments, in operation 1120, the electronic device 300 may select at least one first clip data from the clip data list. According to an embodiment, the electronic device 300 may receive a touch, a gesture, proximity, a hovering input using an electronic pen or a part of the user's body and may select at least one first clip data corresponding to the received input (e.g., 1220 in FIG. 12).

According to various embodiments, in operation 1130, the electronic device 300 may generate at least a portion of the first clip data as second clip data. As described above with reference to FIGS. 7 to 10, the second clip data may be meaningful content extracted from content constituting the first clip data.

According to various embodiments, in operation 1140 referring to FIGS. 11-12 for example, the electronic device 300 may display a first indicator 1230 associated with the first clip data and a second indicator 1240 associated with the second clip data on a display 310. For example, at least one of an account number or a phone number included in the first clip data shown in FIG. 12(b) may be generated as the second clip data and may be displayed on a screen together with the first indicator and the second indicator as shown in FIG. 12(c).

An operation method of an electronic device (e.g., an electronic device 300) according to various embodiments may include displaying content on a display (e.g., a display 310) of the electronic device, storing at least a partial area of the content as first clip data, in response to a user input associated with copying, generating second clip data different from the first clip data, based on at least a portion of the result of analyzing text or an image for the first clip data, and displaying a first indicator for the first clip data and a second indicator for the second clip data on the display. "Based on" as used herein covers based at least on.

According to various embodiments the operation method of the electronic device may further include displaying the content on a first area of the display and displaying the first indicator and the second indicator on a second area of the display, the second area being different from the first area.

According to various embodiments, the second area of the display may include at least a part of a text input keypad including at least one text input element.

According to various embodiments, the displaying of the first indicator and the second indicator may include displaying a text input keypad including at least one text input element to overlap with at least a portion of the content, in response to generating (or storing) the second clip data, and separating and displaying the first indicator and the second indicator from the at least one text input element. For example, the at least one text input element may include at least one of a number, Hangul, an alphabet, or a symbol.

According to various embodiments, the operation method of the electronic device may further include running an application associated with the first clip data or the second clip data, in response to an input for selecting the first indicator or the second indicator.

According to various embodiments, the operation direction of the electronic device may further include displaying the first clip data or the second clip data selected by the input on an execution screen of the application.

According to various embodiments, the first clip data may be in the of text, and the second clip data may be some text of the first clip data.

According to various embodiments, the some text of the first clip data may include at least one of an e-mail address, a phone number, a name, an account number, a schedule, a uniform resource identifier (URI), and a uniform resource locator (URL) included in the first clip data.

According to various embodiments, the first clip data may be in the of an image, and the second clip data may be composed of the result of recognizing at least one object included in the first clip data.

According to various embodiments, the result of recognizing the at least one object may include at least one of an object type and an object name.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device, comprising:
at least one processor comprising processing circuitry;
a display; and
memory configured to store one or more instructions which, which executed by the at least one processor individually and/or collectively, cause the electronic device to:
display a content on the display;
receive a first user input for copying a text portion included in the content displayed on the display;
in response to receiving the first user input:
store the text portion as first clip data;
store second clip data, different from the first clip data, based on analyzing text included in the text portion;
display a first indicator for the first clip data and a second indicator for the second clip data, with a text input keypad including at least one text input element which is displayed to overlap with at least a portion of the content;
receive a second user input for selecting the first indicator or the second indicator;
in case the second user input is for selecting the first indicator, paste first text corresponding to the first clip data; and
in case the second user input is for selecting the second indicator, paste second text corresponding to the second clip data,
wherein the first indicator and the second indicator are separated and displayed from the at least one text input element, and
wherein the at least one text input element includes at least one of: a number, Hangul, an alphabet, or a symbol.

2. The electronic device of claim 1, wherein the one or more instructions further cause the electronic device to:
analyze the text included in the text portion based on identifying if a portion of the text portion stored as the first clip data satisfies data format corresponding to at least one of an e-mail address, a phone number, an account number, a schedule, or a uniform resource locator (URL).

3. The electronic device of claim 1, wherein the one or more instructions further cause the electronic device to:
display the content on a first area of the display and display the first indicator and the second indicator together with the text input keypad on a second area of the display, the second area being different from the first area.

4. The electronic device of claim 1, wherein the one or more instructions further cause the electronic device to:
receive the first user input for copying the text portion in a state where the text input keypad is displayed.

5. The electronic device of claim 1, wherein the one or more instructions further cause the electronic device to:
run an application associated with the first clip data and/or the second clip data, in response to receiving the second user input.

6. The electronic device of claim 5, wherein the one or more instructions further cause the electronic device to:
display the first text corresponding to the first clip data and/or the second text corresponding to the second clip data selected by the second user input on an execution screen of the application.

7. The electronic device of claim 1, wherein the text input keypad comprises a first partial area including at least one text input element and a second partial area for providing an additional function of the text input keypad,
wherein the one or more instructions further cause the electronic device to:
display the first indicator and the second indicator through the second partial area of the text input keypad.

8. The electronic device of claim 1,
wherein the one or more instructions further cause the electronic device to:
store a portion of the text portion as the second clip data.

9. The electronic device of claim 1, wherein the one or more instructions further cause the electronic device to: in response to receiving the first user input, simultaneously display the text input keypad, the first indicator, and the second indicator with a portion of the content displayed before receiving the first user input.

10. The electronic device of claim 1, wherein the one or more instructions further cause the electronic device to: in response to receiving the first user input, extract a second text portion from the text portion based on the analyzing the text included in the text portion, and store the second text portion as the second clip data.

11. The electronic device of claim 1, wherein the one or more instructions further cause the electronic device to:
receive an user input for selecting the text portion included in the content displayed on the display before receiving the first user input; and
in response to receiving the user input for selecting the text portion, display the text input keypad to overlap with at least the portion of the content.

12. An operation method of an electronic device, the operation method comprising:
displaying a content on a display of the electronic device;
receiving a first user input for copying a text portion included in the content displayed on the display;
in response to receiving the first user input:
storing the text portion as first clip data;
storing second clip data, different from the first clip data, based on analyzing text included in the text portion;
displaying a first indicator for the first clip data and a second indicator for the second clip data with a text input keypad including at least one text input element which is displayed to overlap with at least a portion of the content;
receiving a second user input for selecting the first indicator or the second indicator;
in case the second user input is for selecting the first indicator, pasting first text corresponding to the first clip data; and
in case the second user input is for selecting the second indicator, pasting second text corresponding to the second clip data,
wherein the first indicator and the second indicator are separated and displayed from the at least one text input element, and
wherein the at least one text input element includes at least one of a number, Hangul, an alphabet, or a symbol.

13. The operation method of claim 12, further comprising:
analyzing the text included in the text portion based on identifying if a portion of the text portion stored as the first clip data satisfies data format corresponding to at least one of an e-mail address, a phone number, an account number, a schedule, or a uniform resource locator (URL).

14. The operation method of claim 13, wherein the displaying of the first indicator and the second indicator includes:
displaying the content on a first area of the display and display the first indicator and the second indicator together with the text input keypad on a second area of the display, the second area being different from the first area.

15. The operation method of claim 12, wherein the displaying of the first indicator and the second indicator includes:
receiving the first user input for copying the text portion in a state where the text input keypad is displayed.

16. The operation method of claim 12, further comprising:
running an application associated with the first clip data and/or the second clip data, in response to receiving the second user input.

17. The operation method of claim 16, further comprising:
displaying the first text corresponding to the first clip data and/or the second text corresponding to the second clip data, selected by the second user input, on an execution screen of the application.

18. The operation method of claim 12, wherein the text input keypad comprises a first partial area including at least one text input element and a second partial area for providing an additional function of the text input keypad,
further comprising:
displaying the first indicator and the second indicator through the second partial area of the text input keypad.

19. The operation method of claim 12, further comprising:
storing a portion of the text portion as the second clip data.

20. A non-transitory computer-readable storage medium for storing instructions which, when executed by at least one processor of an electronic device, cause the electronic device to perform one or more processes comprising:
displaying a content on a display of the electronic device;
receiving a first user input for copying a text portion included in the content displayed on the display;
in response to receiving the first user input:
storing the text portion as first clip data;
storing second clip data, different from the first clip data, based on analyzing text included in the text portion;
displaying a first indicator for the first clip data and a second indicator for the second clip data with a text input keypad including at least one text input element which is displayed to overlap with at least a portion of the content;
receiving a second user input for selecting the first indicator or the second indicator;

in case the second user input is for selecting the first indicator, pasting first text corresponding to the first clip data; and in case the second user input is for selecting the second indicator, pasting second text corresponding to the second clip data, wherein the first indicator and the second indicator are separated and displayed from the at least one text input element, and wherein the at least one text input element includes at least one of a number, Hangul, an alphabet, or a symbol.

* * * * *